June 13, 1961    H. COANDA    2,988,303
JET SUSTAINED AIRCRAFT
Filed April 30, 1957    7 Sheets-Sheet 1

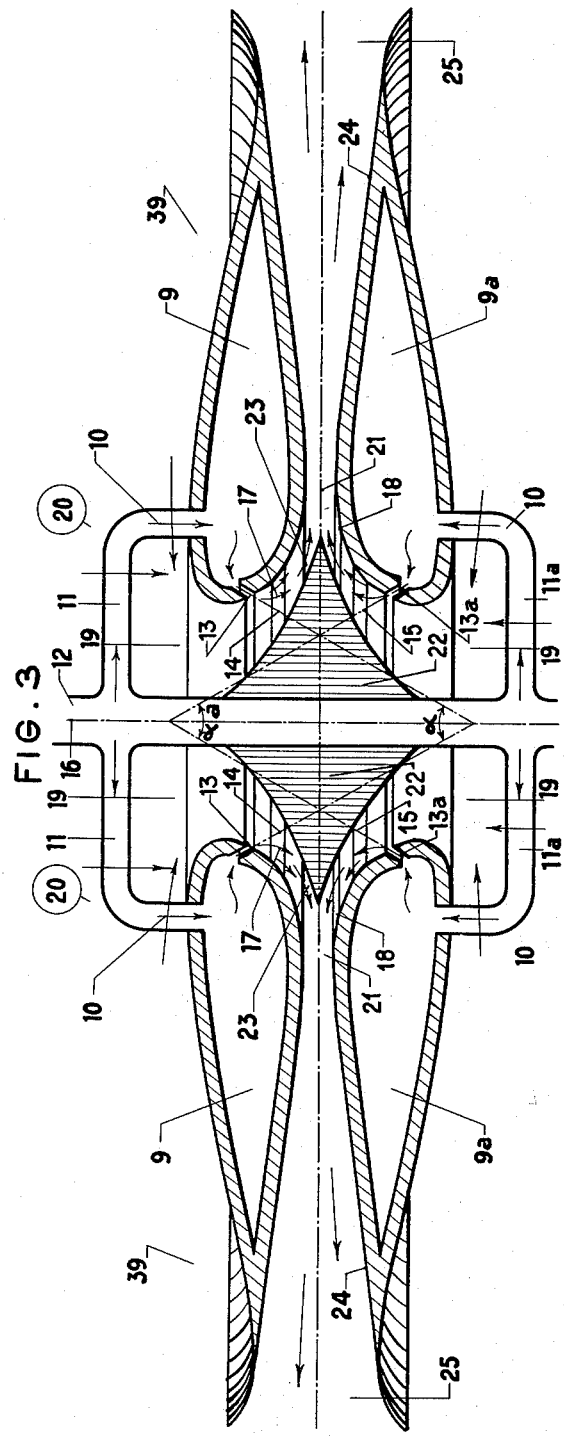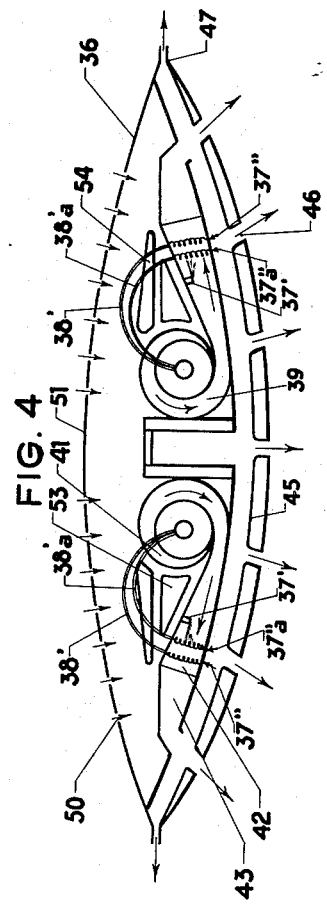

June 13, 1961 H. COANDA 2,988,303
JET SUSTAINED AIRCRAFT
Filed April 30, 1957 7 Sheets-Sheet 5

June 13, 1961 H. COANDA 2,988,303
JET SUSTAINED AIRCRAFT

Filed April 30, 1957 7 Sheets-Sheet 7

United States Patent Office 2,988,303
Patented June 13, 1961

1

2,988,303
JET SUSTAINED AIRCRAFT
Henri Coanda, Paris, France, assignor to Sebac Nouvelle S.A., Lausanne, Switzerland, a corporation of Switzerland
Filed Apr. 30, 1957, Ser. No. 656,026
Claims priority, application France July 24, 1956
9 Claims. (Cl. 244—23)

The present invention relates to an aircraft having a discoid shape and capable of moving vertically and horizontally, of hovering stationary in the air and having a high degree of inherent stability.

Before proceeding to describe the characteristic features of this apparatus, it is desirable to recall what is meant by the physical phenomenon known as the "Coanda effect" which is applied according to the invention for the specified purposes and which is itself described, for example, in U.S. Patent No. 2,052,869 issued September 1, 1936 to Henri Coanda.

The Coanda effect is produced when a gas, or more generally a fluid under pressure, leaves a chamber or container through a slot, the mouth of which has an extended lip. The lip continuously recedes or discontinuously recessed, as where the profile is formed by facets, from the direction of emergence of said pressure fluid. The stream of gas which passes through the slot has a tendency to follow the surface extends the lip, carrying with it a supplementary mass of the ambient fluid. In this way it is possible to carry away and direct a large volume of ambient fluid by a small mass of fluid under pressure.

It is an object of the invention to provide an aircraft wherein the lift of the aircraft is the result of the reaction of a number of discharge nozzles discharging large masses of air downwardly. This air is taken from the upper face of the aircraft.

It is another object of the invention to provide an aircraft wherein the stability thereof is obtained by disposing the aforementioned discharge nozzles so their axes converge in a point located in a suitable manner above the center of gravity of the aircraft.

It is also an object of the invention to provide an aircraft wherein the displacements in a horizontal plane are obtained:
(1) by changes in the orientation of the lifting nozzles; and/or
(2) by the discharges from a series of other nozzles located at the periphery of the aircraft and as far as possible in a horizontal plane passing very close to the center of gravity, and directed in such manner that the axes of thrust thereof pass if possible through the center of gravity.

The invention has also for an object an aircraft wherein the supply of air for the operation of all the discharge nozzles thereof is furnished by at least one power unit blowing relatively large masses of air the air having been drawn-in from the upper face of the discoid aircraft.

Another object of the invention is an aircraft comprising at least one power unit, preferably of toric form, embodying the physical phenomenon known as the "Coanda effect," and using a primary flow obtained by the expansion of a gas (e.g. air) under pressure issuing through a circular slot having a lip which recedes from the direction of emergence of the gas through the slot. The gas is supplied by a thermal generator device and carries along with it a secondary mass of air due to the Coanda effect. The combined primary and secondary masses are capable of driving with them a third mass, and so on, until a sufficient mass of gas is obtained, at the desired pressure, so as to enable the discharge nozzles to work in the required manner, and all of this is accomplished with or without a supplementary addition of

2 energy. The blowing unit or units, have a circular shape and may be disposed in various positions.

The source of energy may, if so required, or if the need therefor becomes apparent, be used also to cool the primary gas.

In order to direct the mixture at the outlet towards the discharge nozzles, the blowing installations may of course employ a number of means (such as, for example, fins) which impart a rotation to the gases so that they can be collected in a spiral collector, followed or not by a divergent.

In order to ensure an easy handling of the aircraft, use may be made of a bearing or direction in space in order that, for example, the aircraft keeps on a predetermined course with respect to the north either using magnetic means, such as a simple compass, or gyroscopic compass actuated by the air sucked in by the power blowing units, or even any other means; in these conditions the cabin for the pilot, crew and eventually passengers is preferably centrally disposed in the aircraft inside a track of rollers so that said cabin may take up, at the will of the pilot, a position wherein he faces the direction of travel of the aircraft.

The aforesaid and other objects, features and advantages of the invention will be more easily and fully understood from the illustration of several embodiments of an aircraft according to the invention with its power nozzles, it being understood that the invention is not restricted to the details of the illustrated and described embodiments, but that it is susceptible of modifications and adoptations.

In the attached drawings:

FIG. 3 is a fragmentary sectional view of an ejector blower device of the aircraft provided with a double suction;

FIG. 4 is a vertical section illustrative of a modification of the aircraft in FIG. 1;

Figure 1:
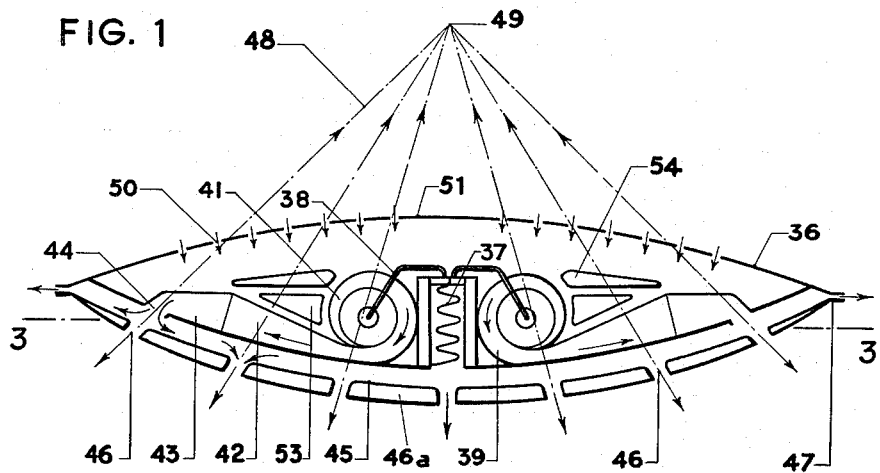
FIG. 1 is a vertical sectional view of a first embodiment of an aircraft according to the invention.
Figure 2:
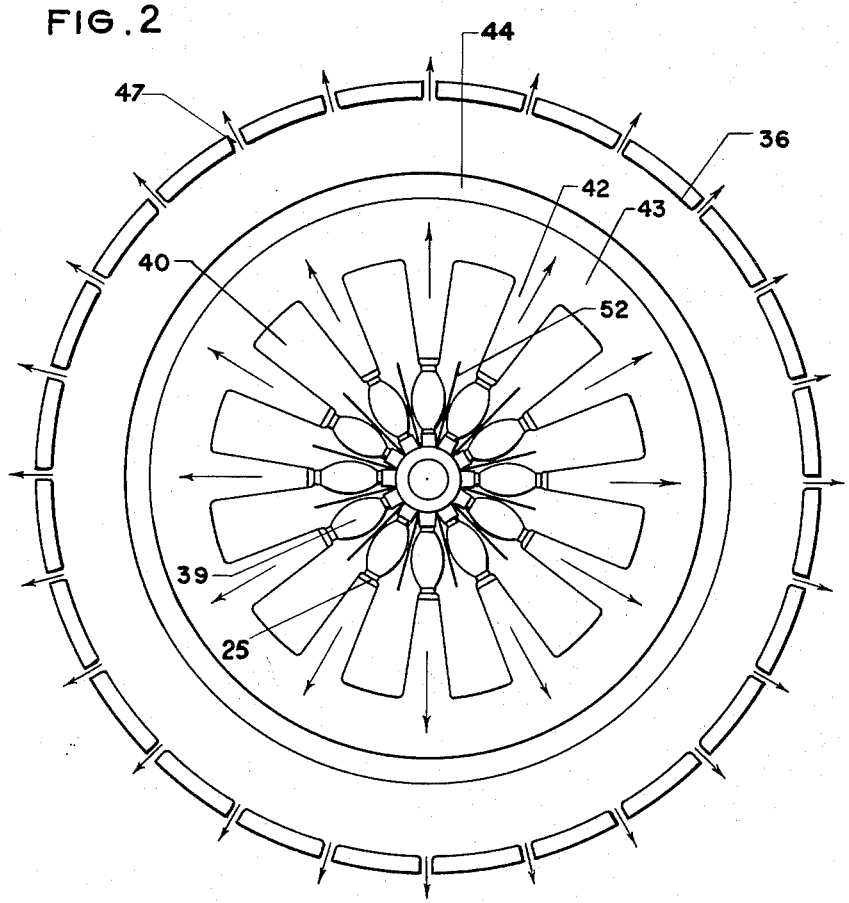
FIG. 2 is a plan view of the same embodiment, with the upper part removed.

In a first form of embodiment shown in FIGS. 1 and 2 a discoid aircraft 36 according to the invention comprises a heating device represented generally at 37 of the boiler type known per se transforming a liquid into gas under pressure. This gas under pressure passes through pipes 38 to a series of ejector blower devices 39 each having a double suction of the type shown in FIG. 3 and similar to the blower described in my copending application Serial No. 656,098 of even date and entitled "Thermo blower."

Figure 3A:
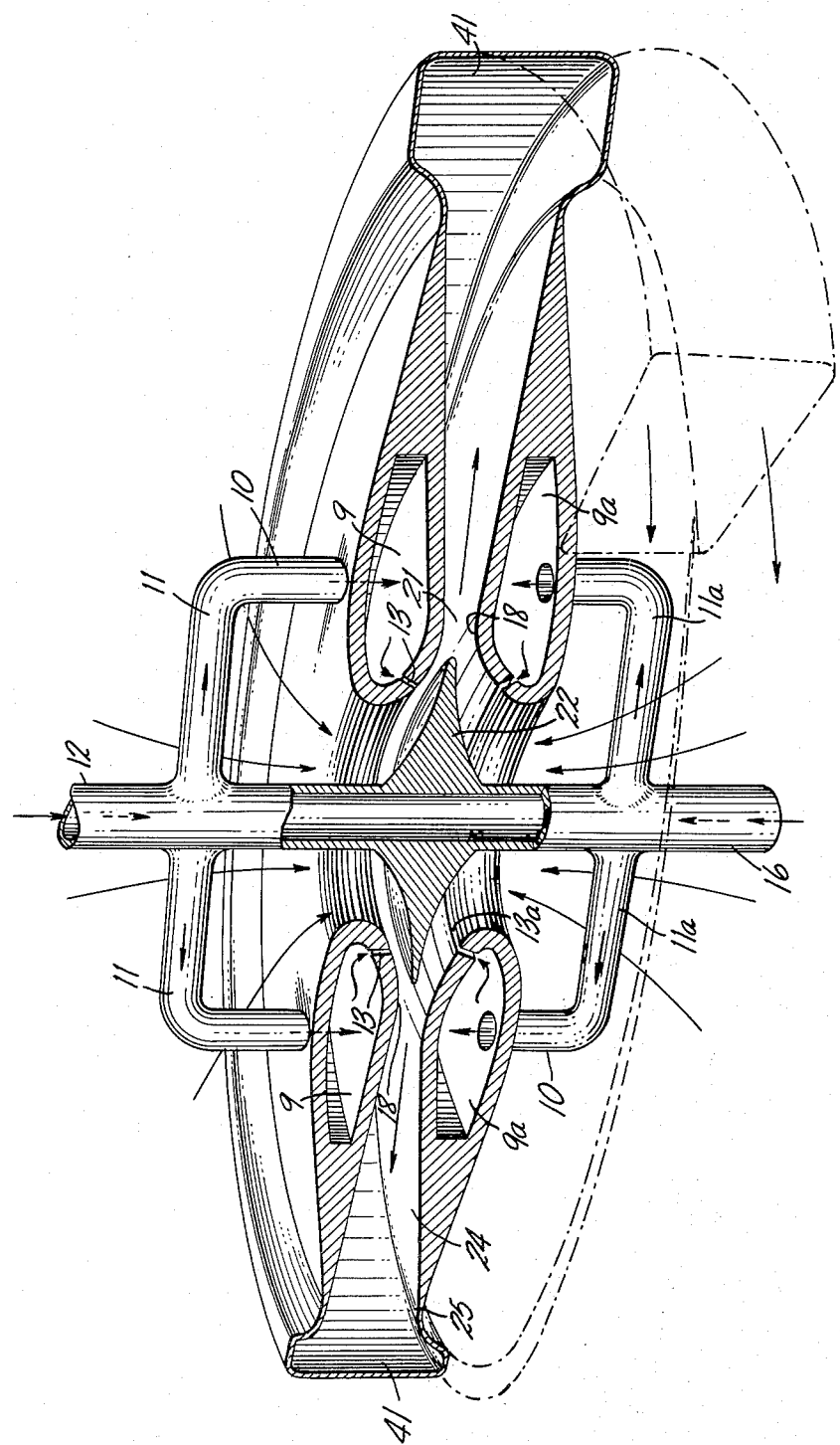
FIG. 3a is a perspective view of the ejector blower device of FIG. 3 and illustrates a chamber around the blower device.

Referring now to FIG. 3 the ejector blower devices each have two annular hollow bodies 9 and 9a of lenticular shape supplied with a gas under pressure, shown by the arrows 10, which is fed through a system of lines 11 and 11a, which are themselves supplied with the gas through the line 12.

Each one of the two annular hollow lenticular bodies have on their inner periphery (i.e. the part nearest of the axis of symmetry 16) a circular slot 13 and 13a. The slots are formed in such a manner that the axes thereof converge forming cones 14 and 15 and make angles alpha and alpha a of about 45 to 70° and preferably about 60°. The gas schematically indicated by the arrow 17 emerges through each slot 13 follows the surface 18 which is formed by one of the extended lips of the mouth of the slot 13. The outgoing stream 17 sucks-in from passage 19 a large quantity of air by the effect known as the "Coanda effect" described in the above-mentioned U.S. patent. The cross-section of passage 19 for the induced air from the surrounding atmosphere 20 becomes progressively smaller up to an area 21 at which there is formed a kind of annular neck.

In order to ensure such a convergent form of this flow of gas and ambient air, a member 22 is fixed to the exterior of the line 12. This member is a body of revolution around axis 16 having a substantially triangular shape in a half section substantially diamond shaped.

In the convergent portion 23, the ambient air becomes very rapidly mixed with the gas issuing from circular slots 13 and 13a and this mixture reaches its highest speed in the neck 21 through which it passes and then follows a shape of the divergent portion 24, so that slows down in speed and converts its kinetic energy into potential energy, up to the discharge area 25. From that point onwards, the mass of the mixture will be led by appropriate means to its point of use in lifting or propulsive discharge nozzles used for the lift and propulsion of the aircraft.

Referring now again to FIGS. 1 and 2, these blowers 39 are mounted vertically and an end and transmit the gas and the induced air 40 to chambers 41 of helical shape, which send the mixture of gas and air through ducts 42 into a collector chamber 43, which in turn directs the mixture through an annular orifice 44 into a distribution chamber 45. This chamber 45 feeds a plurality of lifting discharge nozzles 46 and, depending on requirements propulsion nozzles 47.

The directions or axis of thrust 48 of the lifting discharge nozzles 46 meet at a point 49 which is the metacentre of lift as will be explained in greater detail hereinafter with reference to FIGS. 8 and 9. In this way, the air drawn in at 50 keeps the upper surface 51 in a state of a reduced pressure level while, having been subjected to a certain acceleration, it passes out through the lower surface 46a so as to tend to lift the vehicle because of the pressure differential.

In order to avoid the central blowers 39 interfering with each other, they are separated by vertical panels 52.

The heating device 37 is supplied from a reservoir 53 and the liquid, under pressure to be evaporated, is stored in a tank 54.

Alternatively as shown on FIG. 4 the heater 37 may be replaced by ignition means, as spark plugs 37', and boiler 37" disposed in the chamber 43. The liquid under pressure to be transformed to gas under pressure is then the fuel itself which when gasified in boiler 37" by the heat of combustion as explained below supplies as a primary fluid the blowers 39, by ducts 38', and draws-in the ambient air required for its combustion forming the secondard fluid, and the mixture of gaseous fuel and induced air is ignited by plugs 37' as soon as its speed is reduced in the chamber 43, thereby producing heat, part of which is used, as mentioned hereinabove to vaporize the fuel in boiler 37". If, in this case, the mass of air in induced motion were not sufficient for the combustion, some of the blower units 39 would be supplied through ducts 38'a by steam produced by some heaters or coils forming express type boilers 37"a disposed also in chamber 43 for instance, and the blowers, supplied with steam delivering the mass of air which might be required.

The fuel may be e.g. gasoline, gas oil, jet fuel etc.

On the other hand, in the event steam used a large proportion of this will be condensed and can be collected on the walls of chamber 43.

Figure 5:
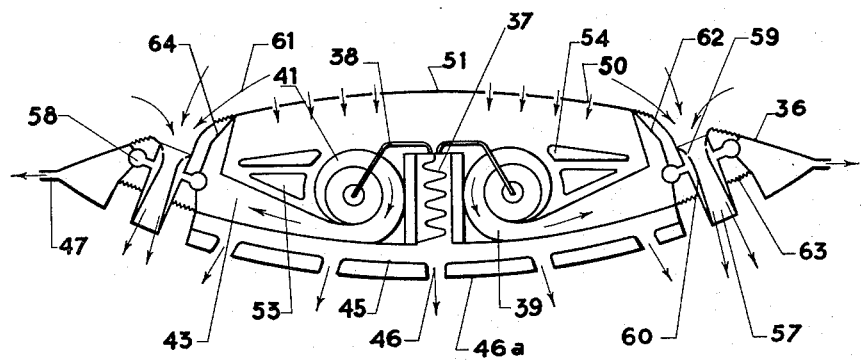
FIG. 5 is a vertical sectional view of a second embodiment of an aircraft according to the invention.
Figure 6:
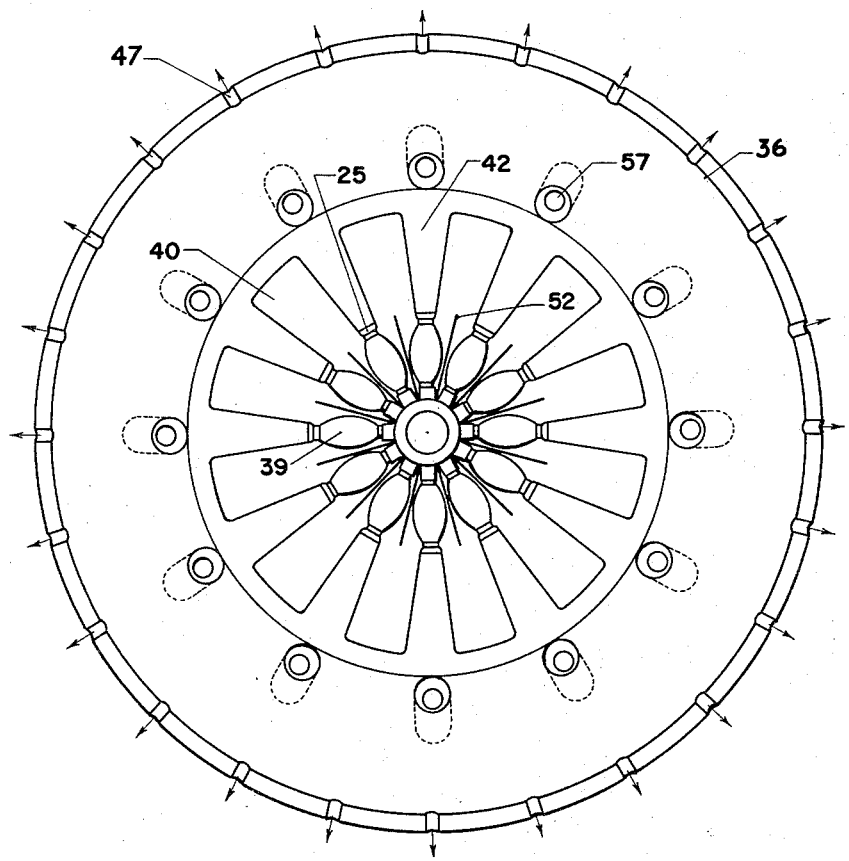
FIG. 6 is a plan view of the embodiment of FIG. 5, with the upper portion thereof removed.

FIGS. 5 and 6 show diagrammatically a further alternative form of construction of an aircraft, according with the invention. The alternative embodiment differs from the form previously described with reference to FIGS. 1 and 2 in that in order to provide life there are provided several discharge nozzles which embody the Coanda effect, so as to further increase the mass of air carried downwardly.

Figure 7:
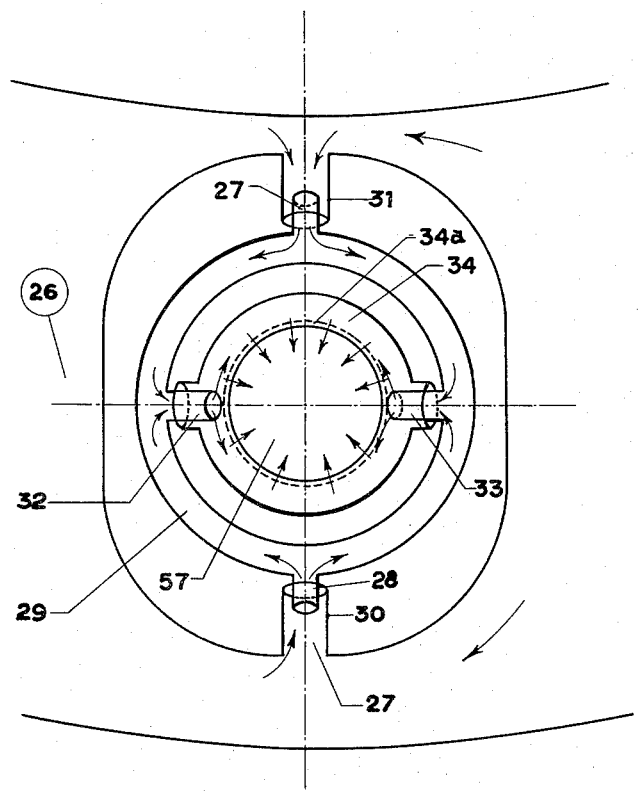
FIG. 7 is a schematic view illustrative of an arrangement of an orientatable lifting nozzle in the aircraft of FIGS. 5 and 6.

In effect, the air collected in the annular collector 43 feeds, in addition to the ordinary lifting discharge nozzles 46, of the same type as in the first embodiment, a series of discharge nozzles 57 embodying the Coanda effect (and of the type described in U.S. Patent 2,770,501, issued November 13, 1956 to Henri Coanda) the orientatable feeding means of said nozzles 57 being shown on FIG. 7.

Reference is now made to FIG. 7 showing the arrangement of an articulated discharge nozzle. Air under a certain pressure leaves the circular chamber 26 and passes through duct 30 and 28 on one hand and ducts 31 and 27 on the other hand into a collector 29. The members 27 and 28 may turn inside the ducts or cylinders 30 and 31. From the collector 29, the air passes through the hollow shafts 32 and 33 to supply a collector 34, which allows the air to pass out into the discharge nozzle 57 through ac ircular slot 34a situated in the inner face of the collector 34.

Referring now again to FIGS. 5 and 6, the air arrives from a piping system 58 at a relative pressure, and through the orientatable device of FIG. 7 at the slots 59 from which it is discharged moves along the inner surface 60 of the discharge nozzle. This surface is the extension of one of the extended lips of the slot 59. Due to the physical effect known as the Coanda effect, the nozzle 57 carries away towards its outlet (which is substantially downwardly directed) a large mass of supplementary air shown schematically by the arrow 61. Since its mounting is articulated by the device of FIG. 7, membranes or diaphragms 62 and 63 can be mounted so as to separate the upper face from the lower face, but these elements 62 and 63 are not absolutely essential since the separators 64 are sufficient.

For the remainder, the operation is the same as that described with reference to FIGS. 1, 2 and 3, both as concerns the other lifting discharge nozzles, if such are provided, and for the propulsion discharge nozzles 47 and the same references are used on FIGS. 1–2 and FIGS. 5–6 for the corresponding elements.

Figure 8:
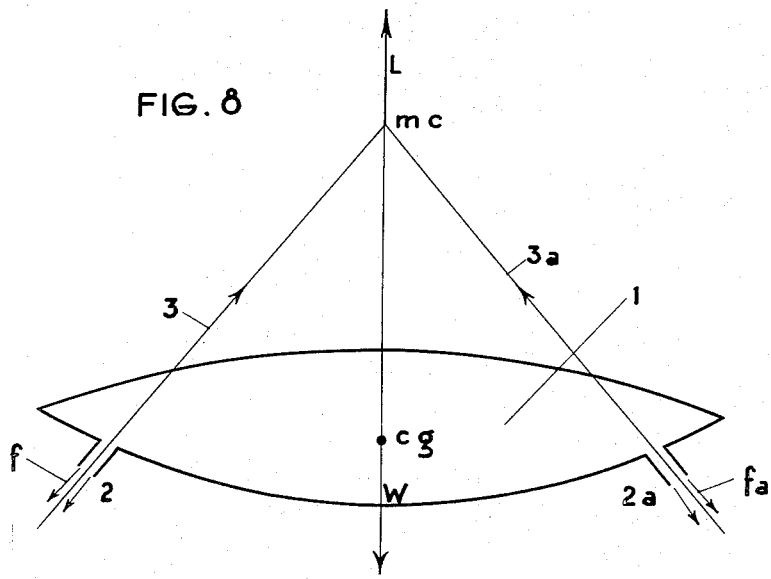
FIG. 8 is a diagram illustrative of the lifting forces applied to an aircraft according to the invention and the stability thereof.
Figure 9:
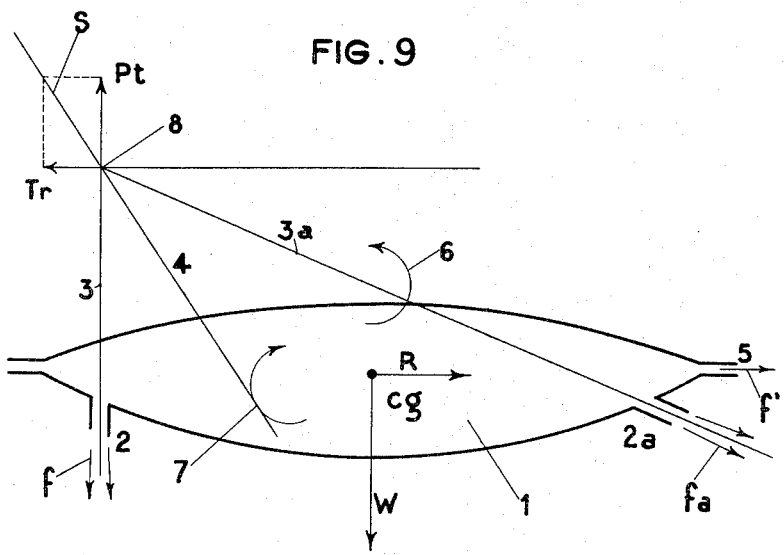
FIG. 9 is a diagram illustrative of the directional movement applied to an aircraft according to the invention.

The lifting, stability and advancing process of the aircrafts of FIG. 1–2, 4 and 5–6 will be now explained first with reference to diagrammatic FIG. 8 and secondly, to FIG. 9 wherein the aircraft is generally shown as 1 and two discharge nozzles 2 and 2a disposed on the lower face of the aircraft through which is discharged (as shown by arrows f, fa) a gas supplied from the interior of the aircraft 1. The axes of thrust 3 and 3a of the gas discharged at 2 and 2a and through the other nozzles (not shown) converge to a point mc., which is the metacenter of the reaction forces, and is located above the center of gravity C.G. of the aircraft. If the sum L of the vertical components of the thrust forces is greater than the weight W of the aircraft, the aircraft will rise.

Since any rolling movement of the aircraft must take place about the center of gravity, and since the apparatus is symmetrical around a vertical axis, it is the position of the metacenter which will be displaced by a rolling movement. In consequence, if for any particular reason a reaction or thrust force, for example at nozzle 2a, becomes greater than the reaction or thrust force at 2, the metacenter will move towards 2 (the apparatus having rotated about its center of gravity C.G.) and there will be produced a torque between the new position of the metacenter and the center of gravity. The torque has the effect of restoring the stability of the aircraft.

In the diagram of FIG. 9, the discharge nozzles 2 and 2a shown as an example are intentionally directed in such a way that the thrust axes 3 and 3a converge in a point 8. If the resultant S of the thrust of nozzles 2 and 2a passes through the center of gravity C.G., the aircraft will move in the direction of the resultant. If however the component Pt is cancelled by the weight W, there will be created a torque 7 with the center of gravity. The component Tr (traction) will create a horizontal movement and will produce with the resistance R, which passes through the center of gravity or in its immediate vicinity, a rotational torque 6 opposed to the torque 7, the two torques being balanced. The movements of the discharge nozzles 2 and 2a should be relatively small, and in order to increase the lateral thrust, discharge nozzles such as 5 should be provided and rendered operative. Nozzle 5 is located in such manner that no torque with respect to the aircraft is produced by its discharge (as shown by arrow f').

In consequence, for lateral movements at low speed, use can eventually be made of the lifting and stabilising discharge nozzles 2 and 2a, but for movements at high speeds, discharge nozzles such as 5 must be used.

In any case, the stability of the aircraft remains unchanged.

Further the aircraft comprises means for rotating and displacing at will the pilot's cabin (not shown) in the interior of the body of the aircraft and means for controlling from the interior of said cabin the closing and opening of any selected discharge nozzle 47 or lifting nozzle 46.

The control of the several nozzles may be advantageously performed by the device described and claimed in my copending application Serial No. 655,972, filed of even date and entitled "A Device for the Simultaneous Control of Lifting and Directional Members" now issued as Patent 2,939,654.

Figures 11, 12:
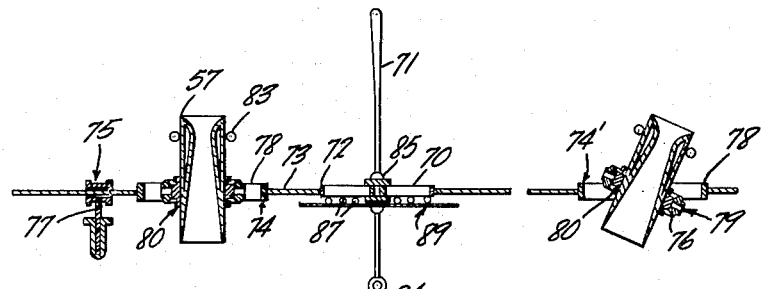
FIG. 11 is a fragmentary elevation view of the device in FIG. 10.
FIG. 12 is a fragmentary view illustrated of a position assumed by a discharge nozzle by movement imparted thereto by the control device of FIG. 10.
Figure 10:
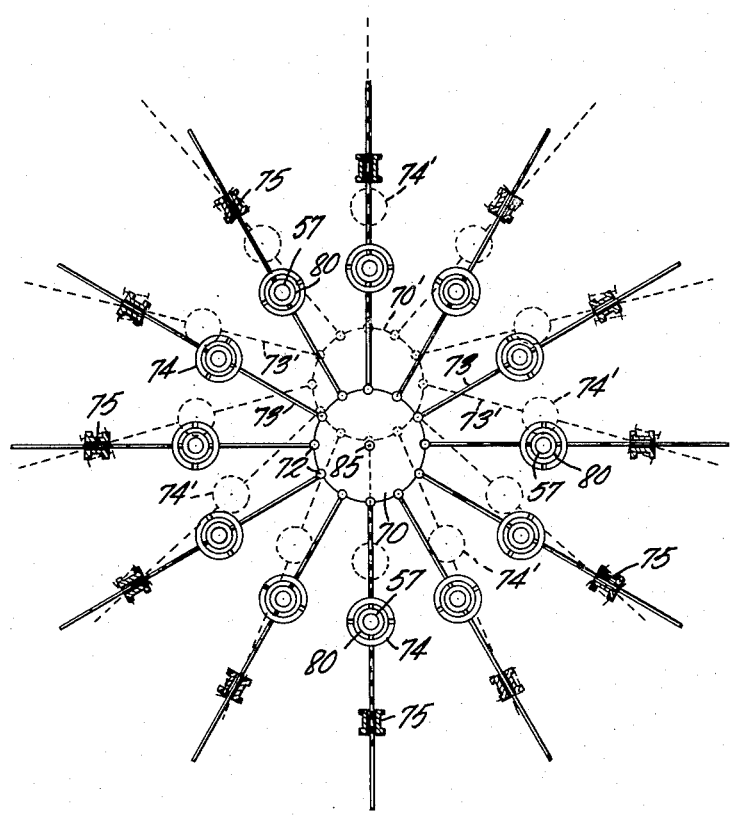
FIG. 10 is a plan view of a control device for discharge nozzles according to the invention.

Referring to FIGS. 10 to 12 inclusive, it is seen that a control device for the nozzles 57 in accordance with the invention is constituted and operates as follows:

A central plate or central control member 70 is capable of taking up a number of positions under the action of a control stick or lever 71, of which one position has been shown in solid lines (position 70) and one in broken lines (position 70) in FIG. 10. Crank-arms or connecting rods 73 articulated to the central plate at 72 then occupy the respective positions 73 and 73' (see FIG. 10) by sliding inside slides or guides 75 which are disposed radially of member 70 and can rotate about a vertical axis 77. Universally tiltable support means 74 occupy the positions 74' when the central control member is shifted to 71' (FIG. 1).

In FIG. 12 there is shown the position of the supports at 74'. The supports each comprise a ring 76 pivotally mounted on a ring 78 by two oppositely disposed rotatable spindles, not shown, which are at ninety degrees to rotatable spindles 79 coupling the ring 74 to a sleeve 80. A discharge nozzle 57 fixed to a swivel joint 83 is arranged to slide inside the sleeve 80. It will be understood that a plurality, for example twelve, of jet tubes or nozzles 57 forming power units of the jet type are arranged angularly spaced radially of member 70 and disposed spaced on the circumference of a circle.

By virtue of this arrangement, when the support 74 is moved to the position 74', which is not necessarily in the plane of symmetry, which is determined by the direction of the shaft 77 and the crank-arm 73, the discharge nozzles 57 can take up an inclined position in a new plane by sliding inside the sleeve 80, the displacement of the control member 70 having taken place due to the action of the lever 71, which is itself fixed to the aircraft by a swivel joint 84. This lever is fixed to the member 71 by an articulation 85 which is of the same kind as that which controls the discharge nozzles 57. Finally, it may be noted that the member 71 slides on balls 87 resting on a surface 89 fixed to the aircraft.

Although the invention has been described with reference to certain specific embodiment thereof, it is to be distinctly understood that various modifications and adaptions of the arrangements herein disclosed may be made as may readily occur to persons skilled in the art without constituting a departure from the spirit and scope of the invention as defined in the objects and in the appended claims.

What I claim is:

1. An aircraft comprising, a hollow discoid body of lenticular section, having a plurality of inlet orifices formed in the upper face of said body, means internally of said body for generating fluid pressure, a plurality of ejector blower devices each having at least one Coanda slot for entrainment of a flow of ambient fluid by the Coanda effect, said ambient fluid being drawn in through said inlet orifices, means for applying said fluid under pressure to the Coanda slot of each said blower device, an annular collector chamber in said body, said chamber receiving the fluid delivered by all said blower devices, a first plurality of lift-devices constituted by jet discharge nozzles disposed in the lower face of said body, the axes of thrust of said nozzles converging in a point spaced substantially above the center of gravity of said body, a second plurality of propulsion devices constituted by jet discharge nozzles disposed adjacent the periphery of said body, said second nozzles having a total section less than that of said first nozzles, and having their axes of thrust converging in a point substantially at the center of gravity of said body, and means for supplying the fluid in said collector selectively to at least one selected lift device and at least one propulsion device.

2. An aircraft comprising, a hollow discoid body of lenticular section having a plurality of inlet orifices formed in the upper face of said body, means internally of said body for generating fluid pressure, a plurality of ejector blower devices, each having at least one Coanda slot for entrainment of a flow of ambient fluid by the Coanda effect, said ambient fluid being drawn in through said inlet orifices, means for applying said fluid under pressure to the Coanda slot of each said blower device, an annular collector chamber in said body, said chamber receiving the fluid delivered by all said blower devices, a first plurality of lift-devices constituted by jet discharge nozzles disposed in the lower face of said body, the axes of thrust of said nozzles converging in a point spaced substantially above the center of gravity of said body, means for orientating the direction of thrust of each lift device, a second plurality of propulsion devices constituted by jet discharge nozzles and having their axes of thrust converging in a point substantially at the center of gravity of said body, and means for controlling from the interior of said body the closing and opening of at least one selected lift-device and at least one propulsion device.

3. An aircraft as claimed in claim 1, in which at least some of said lift-devices are constituted by discharge nozzles provided with Coanda ejector slots producing the Coanda flow entrainment effect.

4. An aircraft as claimed in claim 1, in which the discharge nozzles of said lift-devices are universally articulated with respect to said body.

5. An aircraft as claimed in claim 1, in which said fluid pressure generating means comprises a source of heat acting on a liquid.

6. An aircraft as claimed in claim 1, in which said fluid pressure generating means comprises a source of heat acting on a solid substance.

7. An aircraft as claimed in claim 1, in which said fluid under pressure is a vaporized fuel, and further comprising means for igniting said fuel in the vicinity of the delivery orifice of each said blower device.

8. An aircraft as claimed in claim 1, and further comprising directing fins provided at the outlet of each blower device in order to impress a rotating motion on the discharge gases, and a spiral collector for said gases having a divergent outlet, whereby the kinetic energy of said gases is transformed into potential energy.

9. An aircraft as claimed in claim 1, in which said fluid pressure generating means comprises a compressor of the free-piston type.

References Cited in the file of this patent

UNITED STATES PATENTS

| | | |
|---|---|---|
| 1,344,283 | Webb | June 22, 1920 |
| 1,907,160 | Schauman | May 2, 1933 |
| 2,567,392 | Naught | Sept. 11, 1951 |
| 2,639,084 | Mackenzie | May 19, 1953 |